United States Patent
Migliavacca

(10) Patent No.: US 7,382,594 B2
(45) Date of Patent: Jun. 3, 2008

(54) METHOD OF FORMING AN INTEGRATED VOLTAGE PROTECTION DEVICE AND STRUCTURE

(75) Inventor: Paolo Migliavacca, Mauzac (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 143 days.

(21) Appl. No.: 11/231,069

(22) Filed: Sep. 21, 2005

(65) Prior Publication Data

US 2007/0064362 A1    Mar. 22, 2007

(51) Int. Cl.
*H02H 3/24* (2006.01)
(52) U.S. Cl. .......................................... 361/90; 361/84
(58) Field of Classification Search ................ 361/90
See application file for complete search history.

(56) References Cited

U.S. PATENT DOCUMENTS

| | | | | |
|---|---|---|---|---|
| 4,821,315 A | * | 4/1989 | Remmerie et al. | 379/412 |
| 5,569,550 A | * | 10/1996 | Garrett et al. | 429/7 |
| 5,781,390 A | * | 7/1998 | Notaro et al. | 361/84 |
| 6,424,035 B1 | * | 7/2002 | Sapp et al. | 257/723 |
| 7,119,999 B2 | | 10/2006 | Baldwin et al. | 361/84 |
| 2004/0150927 A1 | | 8/2004 | Stroyer et al. | 361/52 |

OTHER PUBLICATIONS

Data Sheet, "Overvoltage Protection Controllers With Status Flag, MAX4838 MAC4842", Maxim integrated Products, 19-3044, Rev. 1, 4/04, pp. 1-10.

* cited by examiner

*Primary Examiner*—Michael J Sherry
*Assistant Examiner*—Luis E. Román
(74) *Attorney, Agent, or Firm*—Robert F. Hightower

(57) ABSTRACT

In one embodiment, a voltage protection circuit uses two back-to-back transistors to receive an unprotected voltage and form a protected voltage.

15 Claims, 3 Drawing Sheets

METHOD OF FORMING AN INTEGRATED VOLTAGE PROTECTION DEVICE AND STRUCTURE

BACKGROUND OF THE INVENTION

The present invention relates, in general, to electronics, and more particularly, to methods of forming semiconductor devices and structure.

Previously, various methods and circuit structures were used to form over-voltage and under-voltage protection for circuits. In one application that provided both under-voltage and over-voltage protection, two N-channel metal oxide semiconductor (MOS) transistors were connected in series with their sources tied together at a common point. One example of such an application is disclosed in United States patent publication 2004/0150927 by Strayer et al that was published on Aug. 5, 2004. Such an implementation was difficult to integrate onto a single semiconductor substrate due to parasitic diodes associated with integrated transistors. Consequently, this architecture required using non-integrated transistor. The non-integrated transistors increased the cost of the system that used such an architecture.

Accordingly, it is desirable to have a method of protecting circuits from over-voltage and under-voltage conditions that can be integrated onto a single semiconductor substrate.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay between the reaction that is initiated by the initial action.

DETAILED DESCRIPTION OF THE DRAWINGS

Figure 1:
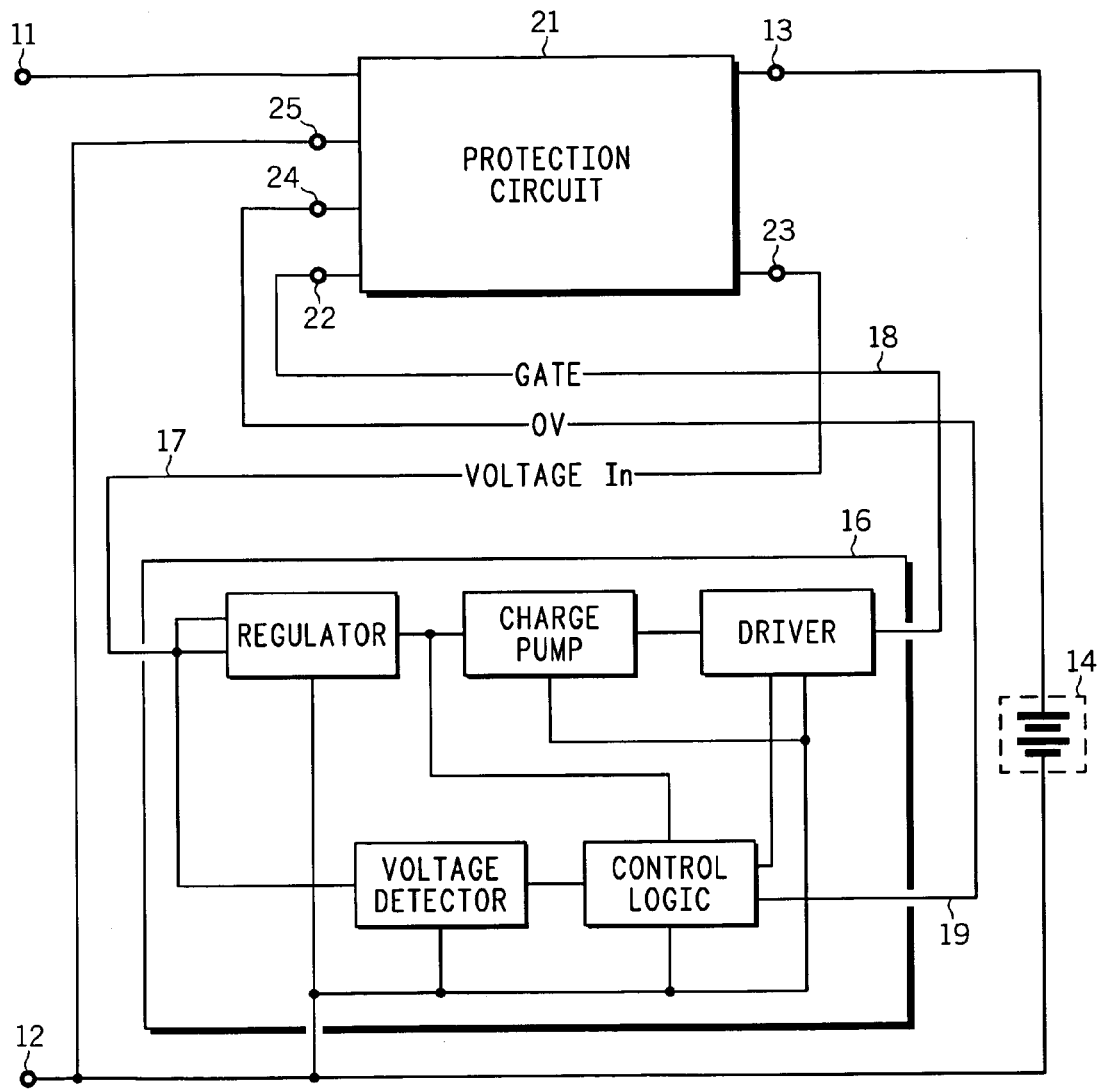
FIG. 1 schematically illustrates an embodiment of a portion of a protection system that includes a protection circuit in accordance with the present invention.

FIG. 1 schematically illustrates an embodiment of portion of a protection system 10 that includes protection for reverse-voltage, under-voltage, and over-voltage conditions. System 10 includes a protection manager circuit or manager 16, a load 14, and a protection circuit 21. Protection circuit 21 receives an unprotected voltage on a voltage input 11 and is configured to couple and decouple load 14 to receive the unprotected voltage responsively to first and second values of the unprotected voltage. Protection circuit 21 is also configured to form a protected voltage on an output 23 responsively to the first and second values of the unprotected voltage. In the preferred embodiment, load 14 is a battery. In other embodiments, load 15 maybe another type of circuit element. System 10 receives the unprotected voltage between a voltage input 11 and a voltage return 12. The unprotected voltage typically is a voltage from a regulated power supply controller that may vary between an under-voltage value and an over-voltage value. Voltage values between the under-voltage value and an over-voltage value are the nominal values of the unprotected voltage. In some embodiments, the unprotected voltage may be a rectified sine wave, such as a full-wave or half-wave rectified. In one exemplary embodiment, the unprotected voltage is a regulated voltage from a power supply controller having a nominal value that is approximately three (3) to seven (7) volts. In the event that a fault occurs in the circuit, not shown, providing the unprotected voltage, the unprotected voltage may increase to a value greater than nominal value and possibly much greater than the over-voltage value. The fault in the circuit providing the unprotected voltage may also result in the unprotected voltage becoming less than the nominal value and much less than the under-voltage value or even coming negative relative to the voltage on return 12. Circuit 21 is configured to provide the protected voltage on output 23 at a value that does not damage circuits that receive the protected voltage. Those skilled in the art will appreciate that the maximum operating voltage may be greater than the nominal value. For the exemplary embodiment having the nominal value that is approximately three (3) to seven (7) volts, the maximum operating voltage may be as much as twenty-eight volts. The maximum operating voltage usually is determined by the type of semiconductor technology that is used to form manager 16 and the semiconductor technology that is used to form transistors 26 and 27.

Manager 16 receives the protected voltage between an input 17 and a voltage return that is typically connected to return 12. Manager 16 includes an internal regulator or regulator that is connected between input 17 and the voltage return to receive the protected voltage from output 23 and provide a regulated voltage that is suitable for operating the elements of manager 16. Manager 16 also usually includes a charge pump, a voltage detector, control logic, and a driver. The voltage detector receives the protected voltage from input 17 and provides a signal to the control logic indicating that the value of the protected voltage is within the nominal range. As will be seen hereinafter, the voltage detector does not detect negative or reverse voltages. However, protection circuit 21 detects the reverse voltage and protects manager 16 by providing a protected voltage that does not damage manager 16 for the reverse voltage condition. The control logic generates an over-voltage (OV) signal on an output 19 that is high when the value of the protected voltage received on input 17 is greater than the over-voltage value and is low for other conditions. The control logic generates a signal to the charge pump that is high when the protected voltage received on input 17 is less than the over-voltage value. The charge pump increases the value of the signal and together with the driver forms a gate signal on an output 18 that has a value that may be greater than the value of the protected voltage received on input 17. Typically, the value of the gate signal is approximately twice the value of the protected voltage as long as the value of the protected voltage is less than the over-voltage value. If the value of the protected voltage is greater than the over-voltage value, output 18 is coupled to a value that is substantially equal to the value of return 12.

Figure 2:
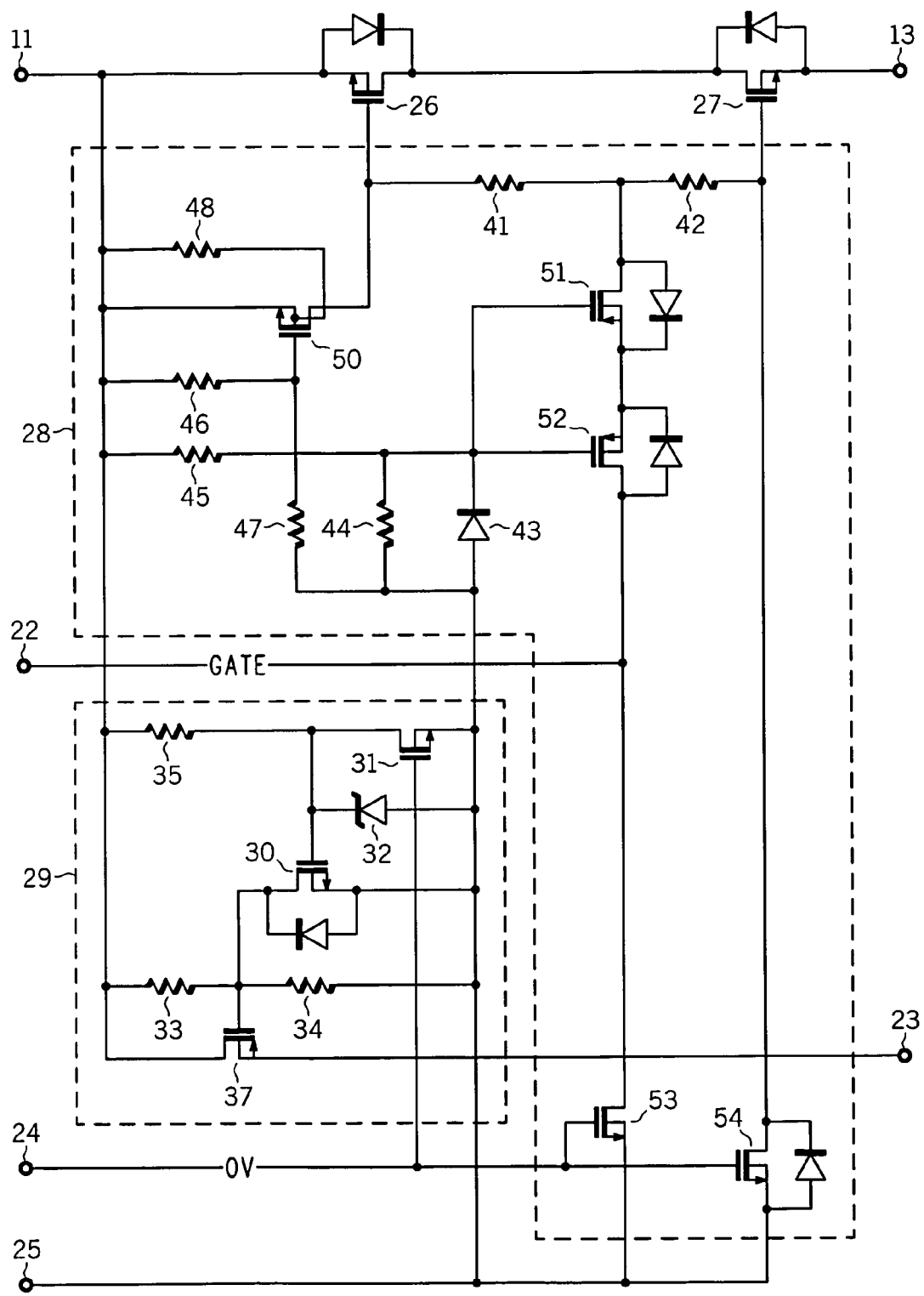
FIG. 2 schematically illustrates a portion of an exemplary embodiment of the protection circuit of FIG. 1 in accordance with the present invention.

FIG. 2 schematically illustrates an exemplary embodiment of a portion of protection circuit 21. This description has references to both FIG. 1 and FIG. 2. Protection circuit 21 includes a first switch device or switch, such as a transistor 26, a second switch device or switch, such as a transistor 27, a signal controller 28, and a reverse voltage controller 29. In the preferred embodiment, transistors 26 and 27 are N-channel LD (lateral double diffused) power MOS transistors (LDMOS). In other embodiments, transistors 26 and 27 may be other types of N-channel transistors as long as they can sustain a high drain-to-gate voltage and have a low on-resistance. Signal controller 28 is configured to receive the unprotected voltage and also receive the gate and OV signals from manager 16. Controller 28 also is configured to provide a first control signal to disable the first switch, such as transistor 26, if the value of the unprotected voltage becomes less than the value of return 12 or reversed, and to provide a second control signal to disable the second switch, such as transistor 27, if the value of the unprotected voltage is greater than the over-voltage value. Reverse controller 29 is configured to receive the over-voltage signal and provide a protected voltage on output 23 that does not go negative in order to protect manager 16 and other circuits that connected to receive the protected voltage. For example, circuits (not shown) that control load 14 may use the protected voltage. Typically, at least transistors 26 and 27 are integrated together on one semiconductor substrate. Preferably, at least transistors 26 and 27 are integrated on the same semiconductor substrate as controllers 28 and 29. In some embodiments, portions of manager 16, such as the voltage detector, the charge pump, the driver, and a portion of the control logic, may also be integrated onto the same semiconductor substrate as transistors 26 and 27. Integrating transistors 26 and 27 onto the same substrate usually forms a parasitic drain-to-substrate diode for each of transistors 26 and 27. Because of this parasitic drain to substrate diode, the drain of transistors 26 and 27 cannot be exposed to the negative going voltage that may be applied to input 11. This reverse voltage could forward bias the diode causing a large current to flow that may damage the circuits. Consequently the drains, or current carrying electrodes, of transistors 26 and 27 are connected together to prevent the reverse voltage from damaging the circuits. Also, the reference current carrying electrodes, or sources, of transistors 26 and 27 are connected to respective input 11 and output 13.

In one example embodiment, load 14 is a five volts battery. In this example embodiment, the nominal vale of the input voltage ranges from about 3.0 to 7.0 volts, thus, voltages greater than about 7.0 volts represent the over-voltage condition. Although the over-voltage value is about 7.0 volts, manager 16 can withstand voltages of up to about 28.0 volts. In this example embodiment, return 12 is connected to the negative terminal of the battery and functions as a ground voltage. In operation of this example embodiment, if the value of the unprotected voltage exceeds the over-voltage value, the voltage detector of manager 16 forces the OV signal high while the control logic and the driver forces the gate signal low. The unprotected voltage on input 11 forward biases the body diode of transistor 50 which clamps the gate of transistor 26 to a voltage that is approximately one diode drop less than the unprotected voltage. Thus, controller 28 provides the first control signal to transistor 26 that forms a gate-to-source voltage (Vgs) for transistor 26 that is less than the threshold voltage and transistor 26 is disabled. The Vgs coupled to transistor 26 is also less than the maximum Vgs that can be sustained by transistor 26 which for this example embodiment is approximately a maximum of about eight volts (8V). In order to ensure that the body diode of transistor 50 becomes forward biased, transistor 50 is formed so that the body is connected to the source of transistor 50. It should be noted that for the exemplary embodiment illustrated in FIG. 2, transistor 50 is an N-channel transistor. When transistor 50 is integrated onto the same substrate as transistors 26 and 27, transistor 50 is formed in an N-well that is formed in a P-type semiconductor substrate as will be understood by those skilled in the art. For such an embodiment, a resistor 48 is connected between input 11 and the N-well in which transistor 50 is formed. If input 11 is negative, resistor 48 limits current flow from return through the parasitic substrate to N-well diode of transistor 50. Even though transistor 26 is disabled, the body diode of transistor 26 may still allow current to flow from input 11. The high OV signal on input 24 enables transistor 54 which pulls the gate of transistor 27 to ground. Since the source of transistor 27 is connected to the battery, the low from transistor 54 disables transistor 27. Disabling transistor 27 decouples the battery from the unprotected voltage on input 11. Note that the body diode transistor 27 prevents current from flowing from input 11 to load 14 when transistor 27 is disabled and ensures that load 14 is decoupled from the unprotected voltage. The high OV signal on input 24 also enables transistor 31 which couples the ground potential to the gate of transistor 30 thereby disabling transistor 30. With transistor 30 disabled, the resistor bridge of resistors 33 and 34 holds the gate of transistor 37 to a voltage that is still lower than the source and the drain voltage from input 11 thereby keeping transistor 37 enabled to couple the unprotected voltage from input 11 to the protected voltage on output 23. Resistors 33 and 34 also limit the Vgs of transistor 37 to a value lower than the maximum Vgs allowed by the technology used to form transistor 37. Even though the protected voltage is now greater than 7.0 volts, manager 16 and other circuits that receive the voltage from output 23 are configured to operate with such voltages without causing damage.

If the value of the unprotected voltage is reversed, resistors 46 and 47 form a voltage divider that forces the gate voltage of transistor 50 to be less negative than the source of transistor 50 thereby enabling transistor 50. Transistor 50 couples a voltage to the gate of transistor 26 that is approximately equal to the value of the unprotected voltage thereby disabling transistor 26. Also, the body diode of transistor 26 is reversed biased so no reverse current can flow from the battery to input 11. Since the OV signal on input 24 is essentially at ground, the body diode of transistor 54 is forward biased which pulls the gate of transistor 27 substantially to the ground potential of return 25 thereby disabling transistor 27. It should be noted that coupling the gate of transistor 27 to return 25 also limits the Vgs coupled to transistor 27 to a value that does not damage transistor 27. The parasitic drain-to-substrate diode of transistor 31 clamps the Vgs of transistor 30 to a voltage close to the ground potential of return 25 thereby protecting the Vgs of transistor 30. The body diode of transistor 30 forces the gate of transistor 37 substantially to the ground potential of return 25 thereby disabling transistor 37 and decoupling the unprotected voltage from output 23. Thus, controller 29 provides a protected voltage on output 23 that does not damage manager 16 or other circuits connected to receive the voltage on output 23.

If the value of the unprotected voltage is within the nominal range, manager 16 forces the OV signal low and the gate signal high. The OV signal generally is about ground while the gate signal is about twice the voltage on input 17 of manager 16 in order to provide a high drive signal for transistors 26 and 27. Resistors 46 and 47 of controller 28 force the gate of transistor 50 to be lower than the positive voltage from input 11 thereby disabling transistor 50. The resistor divider of resistors 44 and 45 couples a voltage to the gates of transistors 51 and 52, that is lower than the voltage on input 11. The low OV signal disables transistors 53 and 54, thus, the high gate signal is received by the drain on transistor 52 which enables transistors 51 and 52. Enabling transistors 51 and 52 applies the gate signal to the gates of transistors 26 and 27 through respective resistors 41 and 42. The resistor bridge of resistors 44 and 45, limits the Vgs received by the gates of transistors 51 and 52 to a value lower than the maximum value that can be sustained by the technology used for forming transistors 51 and 52. Thus, controller 28 provides a first control signal and a second control signal that enable respective transistors 26 and 27 to couple the battery to the unprotected voltage, thereby charging the battery. The low on input 24 also disables transistor 31 which enables transistor 30. The gate of transistor 37 is pulled down and enables transistor 37 which couples the unprotected voltage from input 11 to output 23. It will be appreciated by those skilled in the art, that the voltage limiting preformed by the resistor bridges formed by resistors 33 and 34, resistors 41 and 42, resistors 44 and 45, and resistors 46 and 47 assist in limiting the Vgs of transistors and facilitates integrating the transistors on the same semiconductor substrate as transistors 26 and 27.

In order to provide this functionality for circuit 21, the source of transistor 26 is commonly connected to input 11, a first terminal of resistor 48, the source of transistor 50, a first terminal of resistor 46, a first terminal of resistor 45, a first terminal of resistor 35, a first terminal of resistor 33 and the drain of transistor 37. The drain of transistor 26 is connected to the drain of transistor 27. The gate of transistor 26 is coupled to receive the first control signal from controller 28 by connections to a first terminal of resistor 41 and the drain of transistor 50. The body of transistor 50 is connected to the source of transistor 50, thus, to input 11. The N-well of transistor 50 is connected to the second terminal of resistor 48. The gate of transistor 50 is commonly connected to a second terminal of resistor 46 and a first terminal of resistor 47. The second terminal of resistor 47 is commonly connected a first terminal of resistor 44, an anode of diode 43, the source of transistor 31, the source of transistor 30, a first terminal of resistor 34, the source of transistors 53 and 54, and to input 25. A second terminal of resistor 44 is commonly connected to a second terminal of resistor 45, a cathode of diode 43, a gate of transistor 52, and a gate of transistor 51. The drain of transistor 51 is commonly connected to a second terminal of resistor 41 and a first terminal of resistor 42. The source of transistor 27 is connected to output 13. The gate of transistor 27 is connected to receive the second control signal from controller 28 by a connection to a second terminal of resistor 42 and the drain of transistor 54. A source of transistor 51 is connected to a source of transistor 52. A drain of transistor 52 is commonly connected to input 22 and a drain of transistor 53. The gate of transistor 53 is commonly connected to the gate of transistor 54, input 24, and the gate of transistor 31. The drain of transistor 31 is commonly connected to the gate of transistor 30, a cathode of diode 32, and a second terminal of resistor 35. An anode of diode 32 is connected to return 25. The drain of transistor 30 is commonly connected to a second terminal of resistor 33, a second terminal of resistor 34, and the gate of transistor 37. The source of transistor 37 connected to output 23.

Figure 3:
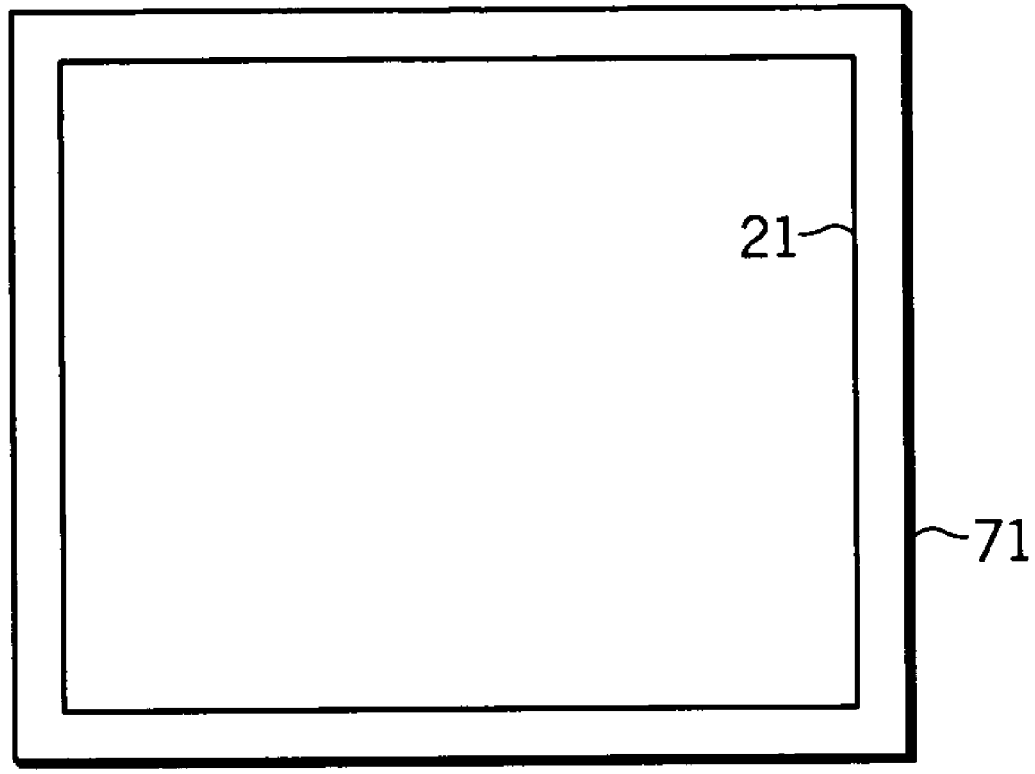
FIG. 3 schematically illustrates an enlarged plan view of a semiconductor device that includes at least a portion of the protection system of FIG. 1 in accordance with the present invention.

FIG. 3 schematically illustrates an enlarged plan view of a portion of an embodiment of a semiconductor device 70 that is formed on a semiconductor die 71. Circuit 21 is formed on die 71. Die 71 may also include other circuits that are not shown in FIG. 3 for simplicity of the drawing. Circuit 21 and device 70 are formed on die 71 by semiconductor manufacturing techniques that are well known to those skilled in the art. In some embodiments, portions of manager 16 may also be formed on die 71 along with circuit 21.

In view of all of the above, it is evident that a novel device and method is disclosed. Included, among other features, is forming an integrated protection device having two back-to-back protection transistors form on the same semiconductor substrate. Coupling the drains of the transistors together facilitates forming the transistors on the same semiconductor substrate so that the integrated protection device may protect circuits from reverse voltages. Using two control signals to control the back-to-back transistors facilitates controlling the transistors to protect circuits from both over-voltage conditions and reverse voltage conditions.

While the subject matter of the invention is described with specific preferred embodiments, it is evident that many alternatives and variations will be apparent to those skilled in the semiconductor arts. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A reverse-voltage and over-voltage protection circuit comprising:
    a first switch device having a control electrode, a current carrying electrode and a reference current carrying electrode, the reference current carrying electrode coupled to receive an unprotected voltage;
    a second switch device having a control electrode, a reference current carrying electrode coupled to a load, and a current carrying electrode that is coupled to the current carrying electrode of the first switch device;
    a control circuit configured to receive the unprotected voltage and disable the second switch device and decouple the load from receiving the unprotected voltage responsively to the unprotected voltage having a value that is greater than an over-voltage value, and to disable the first switch device and decouple the load from receiving the unprotected voltage responsively to the unprotected voltage having a reverse value; and
    a first transistor and a second transistor coupled in series wherein a current carrying electrode of one of the first and second transistors is coupled to the control electrodes of both the first and second switch devices, the first and second transistors operably coupled to receive a control signal and couple the control signal to the control electrodes of the first and second switch devices.

2. The reverse-voltage and over-voltage protection circuit of claim 1 wherein the control circuit has a first output coupled to the control electrode of the first switch device and a second output coupled to the control electrode of the second switch device.

3. The reverse-voltage and over-voltage protection circuit of claim 1 wherein the first switch device and the second switch device are N-channel MOS transistors.

4. The reverse-voltage and over-voltage protection circuit of claim 1 wherein the control circuit is configured to couple a signal to the control electrode of the first switch device that is approximately equal to the unprotected voltage responsively to the unprotected voltage having a reverse value.

5. The reverse-voltage and over-voltage protection circuit of claim 1 wherein the control circuit is configured to couple a signal to the control electrode of the second switch device that is less than a threshold voltage of the second switch device responsively to the unprotected voltage having the value that is greater than the over-voltage value.

6. The reverse-voltage and over-voltage protection circuit of claim 1 wherein the control circuit is configured to couple a first control signal to the control electrode of the first switch device and to couple a second control signal to the control electrode of the second switch device that is different from the first control signal.

7. The reverse-voltage and over-voltage protection circuit of claim 1 wherein the control circuit is configured to couple the control signal to a second one of the first and second transistors responsively to the unprotected voltage having a value that is less than the over-voltage value and greater than the reverse value.

8. The reverse-voltage and over-voltage protection circuit of claim 1 wherein the load is a battery.

9. A method of forming a reverse-voltage and over-voltage protection circuit comprising:
    coupling a reference current carrying electrode of a first switch to receive an unprotected voltage;
    coupling a reference current carrying electrode of a second switch device to a load, and coupling a current carrying electrode of the second switch device to a current carrying electrode of the first switch;
    coupling a first current carrying electrode of a first transistor to receive the unprotected voltage, a second current carrying electrode to a control electrode of the first switch, and a control electrode to receive a control signal; and
    configuring a control circuit to receive the unprotected voltage and enable the first transistor thereby disabling the first switch, configuring the control circuit to disable the second switch device to decouple the load from receiving the unprotected voltage responsively to the unprotected voltage having a value that is greater than an over-voltage value, and configuring the control circuit to enable the first transistor thereby disabling the first switch to decouple the load from receiving the unprotected voltage responsively to the unprotected voltage having a reverse value.

10. The method of claim 9 wherein configuring the control circuit to receive the unprotected voltage includes configuring the control circuit to form a first control signal for a control electrode of the first switch and a second control signal for a control electrode of the second switch device that is different from the first control signal.

11. The method of claim 9 wherein coupling the reference current carrying electrode of the first switch to receive the unprotected voltage includes coupling a source of an N-channel MOS transistor to receive the unprotected voltage.

12. The method of claim 9 wherein coupling the reference current carrying electrode of the second switch device to the load, and coupling the current carrying electrode of the second switch device to the current carrying electrode of the first switch includes coupling a drain of a first N-channel MOS transistor to a drain of a second N-channel MOS transistor.

13. The method of claim 9 wherein configuring the control circuit to receive the unprotected voltage and enable the first transistor includes configuring the control circuit to form a control voltage for a control electrode of the first switch that is approximately equal to the unprotected voltage responsively to the unprotected voltage having the reverse value.

14. The method of claim 13 further including configuring the control circuit to form a control voltage for a control electrode of the second switch device that disables the second switch device responsively to the unprotected voltage having the reverse value.

15. The method of claim 13 further including configuring the control circuit to form a control voltage for a control electrode of the second switch device that is less than a voltage on the reference current carrying electrode responsively to the unprotected voltage having the value that is greater than the over-voltage value.

* * * * *